US007409540B2

(12) United States Patent
Ingerman et al.

(10) Patent No.: US 7,409,540 B2
(45) Date of Patent: *Aug. 5, 2008

(54) CATEGORIZING ELECTRONIC MESSAGES BASED ON TRUST BETWEEN ELECTRONIC MESSAGING ENTITIES

(75) Inventors: Aleksandr Ingerman, Seattle, WA (US); Thomas Welles Millett, Seattle, WA (US); Keith A. McCall, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/688,109

(22) Filed: Mar. 19, 2007

(65) Prior Publication Data

US 2007/0203997 A1     Aug. 30, 2007

Related U.S. Application Data

(63) Continuation of application No. 10/460,526, filed on Jun. 12, 2003, now Pat. No. 7,263,607.

(51) Int. Cl.
*H04L 9/00* (2006.01)

(52) U.S. Cl. ........................ 713/150; 709/245
(58) Field of Classification Search ................. 713/152
See application file for complete search history.

(56) References Cited

U.S. PATENT DOCUMENTS

2002/0049738 A1    4/2002   Epstein
2002/0053019 A1    5/2002   Ruttan et al.
2003/0009698 A1    1/2003   Lindeman et al.
2003/0030680 A1    2/2003   Cofta et al.
2003/0188151 A1   10/2003   Sato et al.
2004/0078596 A1    4/2004   Kent, Jr. et al.
2004/0148356 A1    7/2004   Bishop, Jr. et al.
2004/0153512 A1    8/2004   Friend
2004/0203589 A1   10/2004   Wang et al.
2004/0243678 A1   12/2004   Smith

OTHER PUBLICATIONS

Manco, Giuseppe, et al., "A Framework for Adaptive Mail Classification", ICAR-CNR-Institute of Italian National Research Council, 2002 IEEE, pp. 387-392.

*Primary Examiner*—Matthew B Smithers
(74) *Attorney, Agent, or Firm*—Workman Nydegger

(57) ABSTRACT

The principles of the present invention provide for categorizing electronic messages based on trust between electronic messaging entities. Messaging servers maintain trust lists indicating levels of trust between electronic messaging entities. Trust lists can be generated from existing trust information, such as, for example, address book entries. Messaging servers also maintain activity stores that indicate messaging activity between messaging entities. Based on information in a trust list and, when appropriate, information in an activity store, a messaging server can categorize an accessed electronic message, such as, for example, as unwanted and/or unsolicited. Messaging servers can securely exchange trust list information to increase the possibility of identifying a level of trust between messaging entities, even between messaging entities that have not previously exchanged electronic messages. Exchanged trust list information increases the possibility that a messaging server will be able to appropriately categorize an accessed electronic message.

20 Claims, 4 Drawing Sheets

CATEGORIZING ELECTRONIC MESSAGES BASED ON TRUST BETWEEN ELECTRONIC MESSAGING ENTITIES

CROSS-REFERENCE TO RELATED APPLICATIONS

The present application is a continuation application of U.S. application Ser. No. 10/460,526 filed Jun. 12, 2003 and entitled "Categorizing Electronic Messages Based On Trust Between Messaging Entities" which is incorporated herein by reference in its entirety.

BACKGROUND OF THE INVENTION

1. The Field of the Invention

The present invention relates to electronic messaging, and more specifically, to categorizing electronic messages based on trust between electronic messaging entities.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

In particular, electronic mail has become an important method for communicating. To send an electronic mail message, a sending user typically manipulates an input device, such as a keyboard, within an active electronic mail application to enter text into an electronic mail message. The sending user also typically includes an electronic mail address of a recipient user in the electronic message, for example, by entering text in the "To" field. The sending user then sends the electronic mail message to the recipient user by selecting a "Send" control within the active electronic mail application. Sending the electronic message may cause the electronic mail message to be routed from the sending user's computer system, through a sending mail server, across a network, to a receiving mail server that stores electronic mail messages for the recipient user.

To view the electronic mail message, the recipient user establishes a connection from an electronic mail client application to the receiving mail server. Establishing the connection typically causes all electronic mail messages sent to the recipient user, including the mail message from the sending user, to be transferred from the receiving mail server to the recipient user's computer system. After the electronic mail message from the sending user is transferred, the recipient user may manipulate an input device, such as, for example, a mouse to view the electronic mail message. Manipulating an input device often includes selecting an identifier (e.g., an icon), which represents the electronic mail message, from an "inbox" folder. When the identifier is selected the full text of the electronic message may become viewable to the recipient user.

Sending an electronic mail message to a recipient user is a relatively easy task, as all that is needed to route the electronic mail message is an electronic mail address of the recipient user. Further, most electronic mail applications allow a sending user to easily send the same electronic mail message to a number of recipient users by including multiple electronic mail addresses in the "To" field. Some electronic mail applications even include the functionality to configure a computer system to automatically send an electronic message to multiple recipient users without human intervention. Such computer systems are often configured to "mass mail" advertisements or marketing materials to large numbers of electronic mail addresses. These computer systems are also often configured to send mass mailings to recipient users even if the recipient users have made no request to receive the mass mailing.

Thus, at times, recipient users may receive unsolicited and potentially unwanted electronic mail messages containing advertisements and marketing material. Most recipient users view these types of electronic mail messages as electronic junk mail, and these types of electronic mail messages are often referred to as "SPAM." Receiving SPAM wastes the time of recipient users since time must be taken to review a received electronic mail message before the received electronic mail message can be identified as SPAM. Once identified as SPAM, additional time must be taken to delete the received electronic mail message. As such, computerized techniques have been developed to detect SPAM and, after detection, process SPAM differently than other electronic mail messages.

One SPAM detection technique is to use electronic mail filters configured to categorize electronic mail messages, for example, as SPAM, based on the characteristics of the electronic mail messages. Electronic mail filters can use relatively simple algorithms, such as, for example, searching for key words (e.g., '$$$') within an electronic mail message, or relatively complex algorithms, such as, for example, running a Bayesian analysis on an electronic mail message. Electronic mail filters can also be configured to process SPAM in a way that differs from other electronic mail messages. For example, an electronic mail filter can be configured so that electronic mail messages including specific keywords are categorized as SPAM and moved to a SPAM folder.

Further, more sophisticated individually trainable electronic mail filters have also been developed. An individually trainable filter is typically included in a recipient user's computer system. When an electronic mail message is received at the recipient user's computer system, the recipient user provides feedback about the received electronic mail message to the individually trainable filter. The individually trainable filter analyzes the feedback to incrementally generate rules used to categorize subsequently received electronic messages. After a sufficient amount of feedback is analyzed and corresponding rules generated, this eventually results in the individually trainable filter being able to automatically categorize electronic mail messages with little intervention from the recipient user. Accordingly, if properly configured, electronic mail filters can be useful for reducing the amount of SPAM received by a recipient user.

Unfortunately, electronic mail filters suffer from at least two major drawbacks. One drawback is that it is difficult if not impossible to keep electronic mail filters up to date. Entities that send SPAM (hereinafter referred to as "spammers") continually develop new approaches to attempt defeat known filtering algorithms, such as, for example, altering the arrangement of text in the contents of an electronic mail message. A user of an electronic mail filter may have to frequently check for product updates to maintain the highest level of SPAM protection. Many electronic mail users lack the desire and know how to check for updates with the same frequency spammers develop new approaches to defeating existing filtering algorithms.

Another drawback is that some electronic mail filters require a recipient user to provide significant feedback about received electronic messages. For example, to generate sufficient feedback for an individually trainable electronic mail filter, a recipient user may need to provide feedback on hundreds of electronic messages before the individually trainable electronic mail filter has enough feedback to automatically categorize electronic messages with any degree of accuracy. If a recipient user receives only two or three electronic mail messages a day, it may take weeks or months to generate an appropriate level of feedback.

Another SPAM detection technique is to use electronic mail address blacklists. When an electronic mail address, or even an electronic mail domain, is identified as either sending SPAM or not preventing associated users from sending SPAM, the electronic mail address or electronic mail domain is added to a blacklist. Thereafter, when a recipient user receives an electronic mail message, the recipient user's electronic mail server (or computer system) can check the blacklist to determine if the sender's electronic mail address or electronic mail domain is included in the blacklist. If so, the recipient user's electronic mail server (or computer system) can identify the electronic mail message as SPAM. The recipient user's electronic mail server (or computer system) can then delete the electronic mail message or mark the electronic mail message as SPAM.

Unfortunately, until information associating an electronic mail address with SPAM is indicated, both electronic mail filters and blacklists will identify electronic mail messages from an electronic mail address as legitimate. That is, an electronic mail filter will not identify electronic mail messages as SPAM until received user feedback or updates indicate that electronic messages from a particular electronic mail address are SPAM. Likewise, a blacklist will not identify electronic mail messages as SPAM until received updates indicate that electronic messages from a particular electronic mail address are SPAM. Thus, in the absence of express information indicating that an electronic mail address is associated with SPAM, electronic mail filters and blacklists default to identifying electronic mail messages as legitimate.

Thus, spammers will often intentionally configure electronic mail messages to defeat electronic mail filters and blacklists. For example, when a spammer becomes aware of an electronic mail filter identifying a particular text pattern, the spammer can change the particular text pattern. Similarly, when a spammer's electronic mail address is added to a blacklist, the spammer may simply obtain a new electronic mail address. Other spammers may spoof an electronic mail address or electronic mail domain to defeat existing techniques used to identify electronic mail messages as SPAM. Spoofing changes the domain name of sender's electronic mail address (i.e., the text after the "@" in the electronic mail address) to make it appear as if an electronic mail message was sent from an entity, when that entity did not in fact send the electronic mail message.

Accordingly, when an electronic mail message does not originate from an electronic mail address or domain previously identified as sending SPAM and does not have known characteristics of SPAM, the electronic mail message will typically not be identified as SPAM. Thus, after transfer to a recipient user's inbox, the recipient user is required to spend time manually identifying the electronic mail message as SPAM and appropriately disposing of the electronic mail message. Therefore systems, methods, computer program products, and data structures for identifying unwanted and unsolicited electronic messages in a more proactive manner would be advantageous.

BRIEF SUMMARY OF THE INVENTION

The foregoing problems with the prior state of the art are overcome by the principles of the present invention, which are directed towards methods, systems, computer program products, and data structures for categorizing electronic messages based on trust between electronic messaging entities. A messaging server is network connectable to one or more other messaging servers and a plurality of messaging clients. The messaging server has a trust list that includes trust ratings, for example, based on the degrees of separation between messaging entities, indicating levels of trust between messaging entities. The messaging server also includes an activity store that maintains information representing messaging activity between messaging entities. Based on information in the trust list and potentially also on information in the activity store, the messaging server categorizing electronic messages.

The messaging server accesses an electronic message, such as, for example, an electronic mail message that is to be delivered to a recipient entity that accesses electronic messages from the messaging server. The electronic message includes electronic message data (e.g., the contents of an electronic mail message) that was sent from a sending entity to the recipient entity. The messaging server identifies a sending messaging address (from the electronic message) that corresponds to the sending entity, such as, for example, an address in the "To:" field of an electronic mail message.

The messaging server generates a reliability index for the sending messaging address based at least in part on information in the trust list. A trust list can be created from any existing information that indicates trust between two entities. For example, there is a decreased likelihood that a messaging user would maintain address book entries for entities that send unwanted and/or unsolicited messages to the messaging user. On the other hand, there is an increased likelihood that an electronic messaging user would maintain address book entries for entities that the electronic messaging user trusts not to send unwanted and/or unsolicited electronic messages to the electronic messaging user. Accordingly, address book entries from a number of electronic messaging users can be included in a trust list.

When a received electronic message is from a sending entity that has not previous sent an electronic message to a recipient entity, the messaging server may query a trusted list to identify a level of trust between the sending entity and the recipient entity. To identify a level of trust, the messaging server can determine if any entities in the recipient entity's address book have the sending entity in their address book. For example, it may be that user A trusts user C, user C trusts user B, and that user A has not previously received an electronic message from user B. Thus, when user A does receive an electronic message from user B, the messaging server may check trusted list information for user C (as well as any other users having information in the trusted list). Based on the checked trust list information the messaging server can determine that user A should trust that the electronic message from user B is not an unwanted and/or unsolicited electronic mail message. On the other hand, if user C did not trust user B, the messaging server may check trusted list information for user C (as well as any other users having information in the trusted list) and determine user A should not trust that the electronic message from user B is not an unwanted and/or unsolicited electronic mail message.

In some embodiments, a level of trust can increase or decrease based on subsequent correspondence between the sending entity and the receiving entity. For example, an initial reduced level of trust can be increased as a result of the recipient entity responding to electronic messages received from the sending entity. On the other hand, an initial increased level of trust can be reduced as a result of the recipient entity not responding to electronic messages received from the sending entity. Based on the reliability index (as calculated from trust list information and potentially also activity store information), the electronic messaging server can categorize the electronic message. Below a specified threshold, the electronic message may be categorized as unwanted and/or unsolicited. On the other hand, above the specified threshold, the electronic message may be categorized as legitimate.

To increase the possibility of identifying relationships between messaging entities, and thereby also increase the possibility of being able to appropriately calculate a reliability index for an electronic message, messaging servers can exchange trust list information. When appropriate, trust list information is exchanged in a secure manner such that it is unlikely the trust list information could be meaningfully interpreted were the trust list information to be intercepted. A requesting messaging server can access a received messaging address. From the received messaging address, the requesting messaging server generates a received address hash value (that can potentially be included in a requesting side trust list). The requesting messaging server also generates a public/private key pair.

The requesting messaging server sends a request for remote messaging addresses to a providing messaging server. The request includes the received address hash value and the public key. The providing messaging server receives the request and identifies at least one locally stored messaging address associated with the received electronic messaging address (as represented by the received address hash value). An association between a locally stored messaging address and a received messaging address can result, for example, when the received address hash value is in an entry of a providing side trust list. For example, the received address hash value may be in an entry of the providing side trust list because the received messaging address is in an address book of a messaging user that access electronic messages at the providing messaging server. Alternately, the received address hash value may be in an entry of the providing side trust list because the received address hash value was received in an exchange with another messaging server.

Identifying a locally stored messaging address can include identifying a local address hash value that represents the locally stored messaging address. The providing messaging server can compare the received address hash value to local address hash values in entries of the providing side trusted list. When a match is found, a represented locally stored messaging address is identified as being associated with the received messaging address.

The providing messaging server encrypts the at least one local address hash value with the public key of the public/private key pair. The providing messaging server sends the encrypted at least on local address hash value to the requesting messaging server. The requesting messaging server receives the at least one encrypted remote address hash value and decrypts the at least one encrypted remote address hash value with the private key of the public/private key pair. The requesting messaging server stores the at least one decrypted remote address hash value in a requesting side trust list. Accordingly, the requesting messaging server may be able to provide a reliability index for electronic messages sent by a messaging entity that corresponds to the received electronic messaging address.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
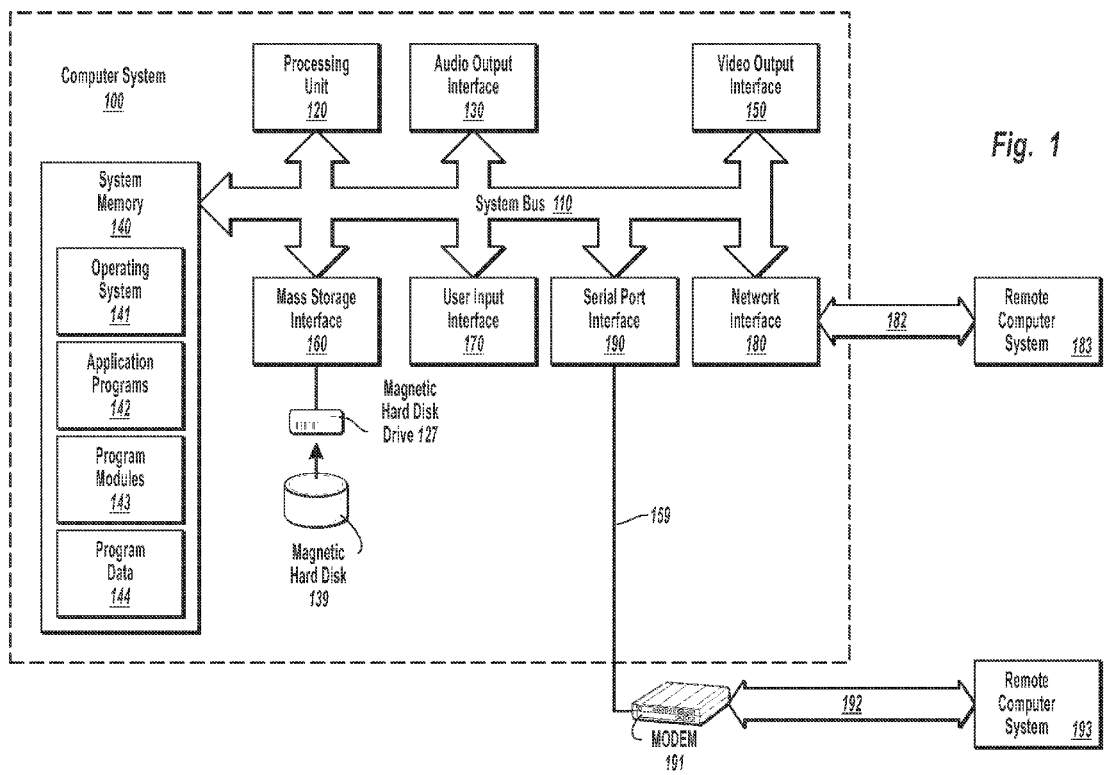
FIG. 1 illustrates a suitable operating environment for the principles of the present invention.

The principles of the present invention provide for categorizing electronic messages based on trust between electronic messaging entities. Messaging servers maintain trust lists indicating levels of trust between electronic messaging entities. Trust lists can be generated from existing trust information, such as, for example, address book entries. Messaging servers also maintain an activity store that indicates messaging activity between messaging entities. Based on information in a trust list and, when appropriate, information in an activity store, a messaging server can categorize an accessed electronic message, such as, for example, as an unwanted and/or unsolicited electronic message. Messaging servers can securely exchange trust list information to increase the possibility of identifying a level of trust between messaging entities, even between messaging entities that have not previously exchanged electronic messages. Exchanged trust list information increases the possibility that a messaging server will be able to appropriately categorize an accessed electronic message.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other storage media which can be used to store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

In this description and in the following claims, "degrees of separation" is defined as the number of inter-nodal intervals along a minimum path of trust from one messaging address to another messaging address. For example, if messaging entity A trusts messaging entity B, messaging entity B can be viewed as one degree of separation from messaging entity A. Further, if message entity B trusts messaging entity C, but messaging entity A does not trust messaging entity C directly (i.e., messaging entities A and C are not one degree of separation apart), messaging entity C can be viewed as two degrees of separation from messaging entity A. When a first messaging entity is separated from a second messaging entity by reduced degrees of separation, the first messaging entity can be viewed as having increased trust for the second messaging entity. On the other hand, when a first messaging entity is separated from a second messaging entity by increased degrees of separation, the first messaging entity can be viewed as having decreased trust for the second messaging entity.

Those skilled in the art will appreciate that the invention may be practiced in network computing environments with many types of computer system configurations, including routers, gateways, bastion hosts, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein. Computer system 100 includes user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 includes video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal. Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140. System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 interoperate to provide nonvolatile storage of computer-executable instructions, data structures, program modules, and other data for computer system 100. For example, magnetic hard disk 139 can store one or more program modules including operating system 141, application programs 142, other program modules 143, and program data 144.

Computer system 100 is connectable to networks, such as, for example, an office-wide or enterprise-wide computer network, an intranet, and/or the Internet. Computer system 100 can exchange data with external sources, such as, for example, remote computer systems and/or remote databases over such a network. Computer system 100 includes network interface 180, through which computer system 100 receives data from external sources and/or transmits data to external sources. As depicted in FIG. 1, network interface 180 facilitates the exchange of data with remote computer system 183 via link 182. Link 182 represents a portion of a network, and remote computer system 183 represents a node of the network. For example, computer system 100 may be a messaging server that exchanges trust list information with remote computer system 183 over link 182.

Likewise, computer system 100 includes serial port interface 190, through which computer system 100 receives data from external sources and/or transmits data to external sources. Serial port interface 190 is coupled to modem 191 via link 159, through which computer system 100 receives data from and/or transmits data to external sources. As depicted in FIG. 1, serial port interface 190 and modem 191 facilitate the exchange of data with remote computer system 193 via link 192. Link 192 represents a portion of a network, and remote computer system 193 represents a node of the network. For example, computer system 100 may be a messaging server that exchanges trust list information with remote computer system 193 over link 192.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Modules of the present invention, as well as associated data, can be stored and accessed from any of the computer-readable media associated with computer system 100. For example, portions of such modules and portions of associated program data may be included in operating system 141, application programs 142, program modules 143, and/or program data 144, for storage in system memory 140. When a mass storage device, such as, for example, magnetic hard disk 139, is coupled to computer system 100, such modules and associated program data may also be stored in the mass storage device. In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
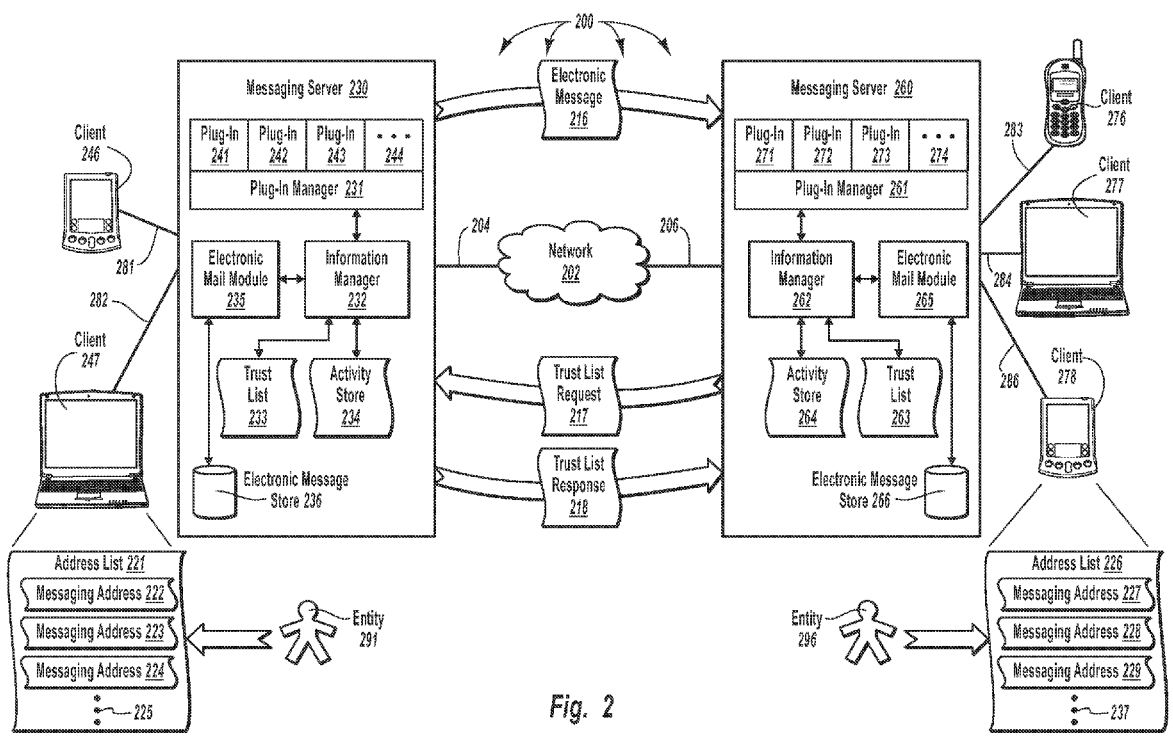
FIG. 2 illustrates an example network architecture that facilitates categorizing electronic messages and securely exchanging trust list information in accordance with the principles of the present invention.

FIG. 2 illustrates an example network architecture 200 that facilitates the categorization of electronic messages and the secure exchange of trust list information. Within network architecture 200, messaging servers 230 and 260 are each connected to network 202 by corresponding links 204 and 206 respectively. Network 202 can be a local area network ("LAN"), a wide area network ("WAN"), or even the Internet. Messaging server 230 is connected to clients 246 and 247 by corresponding links 281 and 282 respectively. Clients 246 and 247 can be used by messaging entities (e.g., entity 291) to access electronic messages from electronic message store 236. Electronic mail module 235 coordinates the exchange of electronic messages between clients 246 and 247 and electronic message store 236. Information manager 232 coordinates the exchange of electronic messages, trust list information, and activity store information between trust list 233, activity store 234, plug-in manager 231, and electronic mail module 235.

Plug-in manager 231 can deliver electronic messages, trust list information, and activity store information to plug-ins, such as, for example, plug-ins, 241, 242, and/or 243, that are designed to perform actions on electronic messages. Based on trust list information and/or activity store information, plug-ins can calculate the urgency of an electronic message, categorize an electronic message as an unwanted and/or unsolicited electronic message, or cause other plug-ins to bypass further processing on an electronic message that appears to be from a mailing list. Plug-ins 241, 242, and 243 can each indicate a priority to plug-in manager 231. Plug-ins with higher priority can be called before plug-ins with lower priority. For example, a mailing list bypass plug-in may be given a higher priority so that it is called before a junk mail plug-in. Thus, the mailing list bypass plug-in may be able to indicate to other plug-ins that an electronic message is possibly associated with a mailing list and that other plug-ins should not process the electronic message. Ellipsis 244 represents that additional plug-ins may have registered with plug-in manager 231.

Similarly, messaging server 230 is connected to clients 276, 277, and 278 by corresponding links 283, 284, and 286 respectively. Clients 276, 277, and 278 can be used by messaging entities (e.g., entity 296) to access electronic messages from electronic message store 266. Electronic mail module 265 can coordinate the exchange of electronic messages between clients 276, 277, and 278 and electronic message store 266. Information manager 262 coordinates the exchange of electronic messages, trust list information, and activity store information between trust list 263, activity store 264, plug-in manager 261, and electronic mail module 265. Similar in operation to plug-in manager 231, plug-in manager 261 can deliver electronic messages, trust list information, and activity store information to plug-ins, such as, for example, plug-ins, 271, 272, and/or 273, that are designed to perform actions on electronic messages. Plug-ins 271, 272, and 273 can each indicate a priority to plug-in manager 261. Ellipsis 274 represents that additional plug-ins may have registered with plug-in manager 274.

Figure 3:
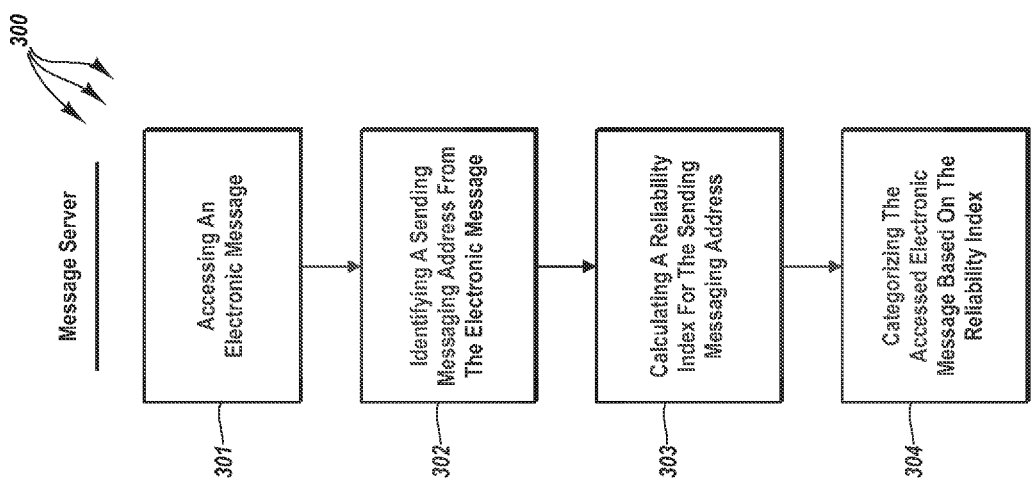
FIG. 3 illustrates an example flowchart of a method for categorizing an electronic message based on trust between electronic messaging entities in accordance with the principles of the present invention.

FIG. 3 illustrates an example flowchart of a method 300 for categorizing an electronic message based on trust between electronic messaging entities in accordance with the principles of the present invention. The method 300 will be discussed with respect to the clients and messaging servers depicted in network architecture 200. Method 300 includes an act of accessing an electronic message (act 301). Act 301 can include a messaging server accessing an electronic message that includes messaging data sent from a sending entity to a recipient entity. For example, messaging server 260 can access electronic message 216 that was sent from entity 291 to entity 296. Similarly, messaging server 230 may also access electronic message 216 that was sent from entity 291 to entity 296. Thus, a messaging server can access an electronic message as it is being sent from or received at the messaging server.

Method 300 includes an act of identifying a sending messaging address from the electronic message (act 302). Act 302 can include the messaging server identifying a sending messaging address from the accessed electronic message. An identified sending messaging address may be a messaging address (e.g., an electronic mail address of the format "<entity-identifier>@<domain name>") that corresponds to the sending entity. For example, messaging server 260 can identify a messaging address from electronic message 216 that corresponds to entity 291. A messaging address can be identified from a header portion of an electronic message, such as, for example, from a Simple Mail Transfer Protocol ("SMTP") header in an electronic mail message.

Method 300 includes an act of calculating a reliability index for the sending messaging address (act 303). Act 303 can include a messaging server calculating a reliability index based at least in part on information in a trust list. For example, messaging server 260 can calculate a reliability index for a messaging address that corresponds to entity 291 based at least in part on information in trust list 263. Information in a trust list can indicate a level of trust between a sending entity and a recipient entity. For example, information in trust list 263 can indicate a level of trust between entity 291 and entity 296.

A trust list can be created from any existing information, such as, for example, address book entries, that indicates trust between two entities. That is, there is a decreased likelihood that a messaging entity would maintain address book entries for other messaging entities that send unwanted and/or unsolicited messages to the messaging entity. For example, it is unlikely that entity 296 would maintain an address book entry for entity 291 if entity 291 sends unwanted and/or unsolicited messages to the entity 296. On the other hand, there is an increased likelihood that a messaging entity would maintain address book entries for other messaging entities that do not to send unwanted and/or unsolicited electronic messages to the messaging entity. For example, there is an increased likelihood of entity 296 maintaining an address book entry for entity 291 if entity 291 does not send unwanted and/or unsolicited messages to the entity 296.

Accordingly, address book entries for messaging entities that access electronic messages at a messaging server can be used by the messaging server to create a trusted list. For example, messaging addresses 222, 223, and 224, as well as any additional messaging addresses as indicated by vertical ellipsis 225, can be retrieved from address list 221 for inclusion in trust list 233. Entities corresponding to message addresses 222, 223, and 224 can be viewed as one degree of separation away from entity 291. Messaging addresses from the address lists of any other entities that access electronic messages at messaging server 230 (e.g., through clients 246 and 247) can also be retrieved for inclusion in trust list 233. Similarly, messaging addresses 227, 228, and 229, as well as additional messaging addresses as indicated by vertical ellipsis 237, can be retrieved from address list 226 for inclusion in trust list 263. Entities corresponding to message addresses 227, 228, and 229 can be viewed as one degree of separation away from entity 296. Messaging addresses from address lists of other entities that access electronic messages at messaging server 260 (e.g., through clients 276, 277 and 278) can also be retrieved for inclusion in trust list 263.

Messaging servers can also exchange trust list information with other messaging servers to increase the possibility of identifying a level of trust between messaging entities, even between messaging entities that have not previously exchanged electronic messages. Exchanged trust list information increases the possibility that a messaging server will be able to appropriately categorize an accessed electronic message. For example, messaging server 230 can send trust list information contained in trust list 233 to messaging server 260. Similarly, messaging server 260 can send trust list information contained in trust list 263 to messaging server 230. Accordingly, entities with increased degrees of separation can be identified.

Trust list information in a trust list can be stored in trust list entry data structures that represent degrees of separation between messaging addresses. One of the fields of a trust list entry data structure can be a remote messaging address value that represents a remote messaging address. A remote messaging address value can be a messaging address of a remote messaging entity or a hash value of a messaging address of a remote messaging entity (e.g., generated from the SHA-1 or MD-5 hashing algorithms). In some embodiments, cryptographically strong one-way hash values of messaging addresses are used. For example at messaging server 230, a messaging address for entity 296 can be viewed as a remote messaging address.

Another of the fields of a trust list entry data structure can be a local messaging address value that represents a locally stored messaging address. A local messaging address value can be a messaging address of a local messaging entity, a messaging address of a remote messaging entity that was received and stored at a server, or a hash value of a messaging address of a local or remote messaging entity (e.g., generated from the SHA-1 or MD-5 hashing algorithms). For example at messaging server 230, a messaging address for entity 291 or even entity 296 can be stored locally. Another of the fields of a trust list entry data structure can be a separation value that represents the degrees of separation between the remote messaging address and the locally stored messaging address. Another of the fields of a trust list entry data structure can be a time stamp value that represents the last time the trust list entry data structure was inserted into a corresponding trust list. Accordingly, a trust list entry data structure may be of the format:

Trust_List_Entry
{
   Remote Messaging Address Field,
   Local Messaging Address Field,
   Degrees of Separation Field,
   Timestamp Field
}

A trust list can include a plurality of trust list entries to indicate degrees of separation between a plurality of messaging entities. For example, trust list 233 can include trust list entries for messaging entities that correspond to messaging addresses 222, 223, and 224, indicating that the messaging entities have one degree of separation from entity 291. Likewise, trust list 263 can include trust list entries for messaging entities that correspond to messaging addresses 227, 228, and 229, indicating that the messaging entities have one degree of separation from entity 296. When messaging server 230 and messaging server 260 exchange trust list information, trust list entries representing greater degrees of separation may be created. For example, when messaging address 227 corresponds to entity 291, trust list 263 may include trust list entries for messaging entities that correspond to messaging addresses 222, 223, and 224, indicating that the messaging entities have two degrees of separation from entity 296.

When a recipient entity has not previously received an electronic message from a sending entity, an information manager may calculate a reliability index based on a trust list entry that indicates the degrees of separation between the sending and recipient entities. For example, if entity 291 sends electronic message 216 to entity 296, information manager 262 can calculate a reliability index for electronic message 216 based on a trust list entry (in trust list 263) that indicates the degrees of separation between entity 291 and entity 296. Although the number of ways in which a reliability index can be calculated from an indication of degrees of separation is virtually limitless, Equation 1 represents an example equation that may be used to calculate a reliability index:

$$\text{RELIABILTY\_INDEX} = (N+A)*1000$$

where $$N=((\text{MAX\_DEGREES}-\text{DEGREE\_OF\_SEPARATION})/\text{MAX\_DEGREES})\times 0.8$$

and where $$A=(1 \text{ if the sending entity is in the recipient entity's address book or 0 otherwise})\times 0.2$$

Equation 1

Within Equation 1, MAX_DEGREES represents the greatest degree of separation stored in the trusted list. MAX_DEGREES is configurable. When more comprehensive trust information is desired MAX_DEGREES can be increased. On the other hand, when less comprehensive trust information is desired MAX_DEGREES can be decreased. Equation 1 gives degree of separation an 80% weight and gives inclusion in an address book a 20% weight.

Accordingly, sending entities having reduced degrees of separation from recipient entities and sending entities that are in recipient entities' address books will receive increased reliability index values. Increased reliability index values can indicate that electronic messages from a sending entity have a reduced likelihood of being unwanted and/or unsolicited electronic messages. Conversely, sending entities having increased degrees of separation from recipient entities and sending entities that are not in recipient entities' address books will receive decreased reliability index values. Decreased reliability index values can indicate that electronic messages from a sending entity have an increased likelihood of being unwanted and/or unsolicited electronic messages. When a sending entity is not in a trusted list, an electronic message from the sending entity is given a reliability index of zero. A reliability index of zero can indicate that a messaging sever does not have sufficient trust information to calculate a reliability index for a sending entity.

A history of correspondence between messaging entities can be used to adjust a reliability index value. For example, when messaging entities frequently exchange electronic messages this can indicate an increased likelihood that the messaging entities trust one another not to send unwanted and/or unsolicited electronic messages. On the other hand, when a sending entity repeatedly sends electronic messages to a recipient entity without a response from the recipient entity, this can indicate a decreased likelihood that the recipient entity trusts the sending entity not to send unwanted and/or unsolicited electronic messages.

Correspondence information associated with a messaging entity can be stored in an activity store. When appropriate, an information manager can use correspondence information from an activity store when calculating a reliability index value. For example, information manager 232 can use correspondence information in activity store 234 when calculating a reliability index value for an electronic message sent to entity 291. Likewise, information manager 262 can use correspondence information in activity store 264 when calculating a reliability index value for an electronic message sent to entity 296.

Correspondence information in an activity store can be stored in activity store entry data structures that represent the history of messaging activity between messaging entities. Table 1 includes some of the fields that can be included in an activity store entry data structure and what is represented by those fields in an activity store entry data structure.

TABLE 1

| Field | Field Value Represents |
|---|---|
| local_address | Messaging address of a local messaging entity |
| remote_address | Messaging address of a remote messaging entity that is one degree of separation away the local messaging entity |
| messages_sent | Number of messages sent from local messaging entity to remote messaging entity |
| messages_received | Number of messages received by local messaging entity from remote messaging entity |
| thread_count | Number of conversations between local and remote messaging entities. This can represent the number of email messages exchanged (sent and received) between the local and remote messaging entities that were not replies to other electronic messages |
| local_origin | A flag indicating whether the remote messaging entity is actually local. For example, within the local messaging entities domain |
| in_address_book | A flag indicating whether the remote messaging entity is present in the local messaging entity's address list. |
| messages_sent_size | Total size of all electronic messages sent to the remote messaging entity |
| messages_received_size | Total size of all electronic messages received from the remote messaging entity |
| trust_capable | A flag indicating whether the remote messaging address server maintains correspondence and trust list information |
| updates_wanted | An indication of whether the messaging server that serves the remote messaging entity has requested trusted list update notification. |
| Last_update_on | The date on which the last trusted list update was received |

Correspondence information represented in any of the fields in Table 1 can be used to modify a calculated reliability index value. When a value of a field indicates increased trust, a reliability index value can be increased based on the value of the field. For example, when a remote messaging entity is actually a local messaging entity (e.g., in the same domain) a reliability index value can be increased. On the other hand, when a value of a field indicates decreased trust, a reliability index value can be decreased based on the value of the field.

Method 300 includes an act of categorizing the electronic message based on the reliability index (act 304). Act 304 can include a messaging server categorizing the accessed electronic message based at least in part on the calculated reliability index. For example, messaging server 260 can categorize electronic message 216 based at least in part on a reliability index value calculated for electronic message 216. It may be that a plug-in categorizes an electronic message based on information received from an information manager. For example, plug-in 272 can categorize electronic message 216 based on a calculated reliability index, trust information from trust list 263, and correspondence information from activity store 264. Accordingly, a plug-in can be configured to categorize an electronic message based on the desires of the plug-in developer.

A plug-in can be configured to categorize an electronic message as legitimate or unsolicited and/or unwanted (e.g., categorizing an electronic message as SPAM). A plug-can can append a SPAM indicator to an electronic message categorized as unwanted and/or unsolicited. For example, when electronic message 216 is categorized as unwanted and/or unsolicited, plug-in 272 may modify the "Subject:" line of electronic message 216 to include the string "<SPAM>". When electronic message 216 is categorized as unwanted and/or unsolicited plug-in 272 can also set an X-Priority header for electronic message 216 to a lower value. When electronic message 216 is not categorized as unwanted and/or unsolicited, plug-in 272 may not alter message 216.

Figure 4:
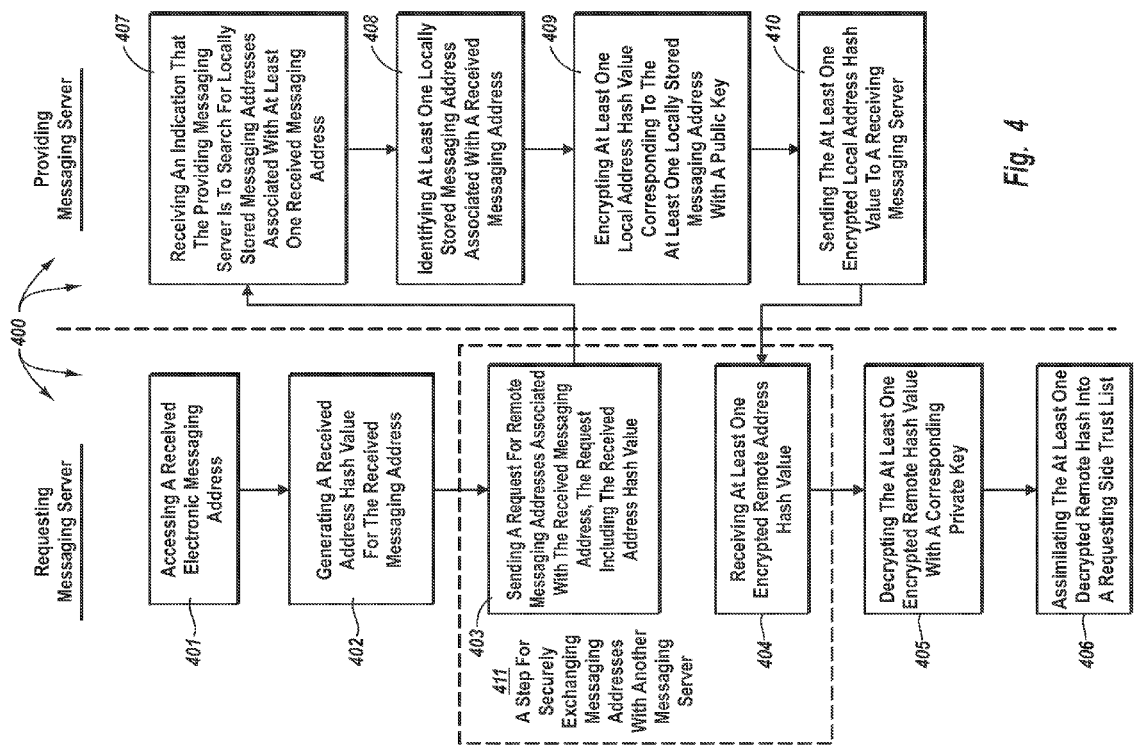
FIG. 4 illustrates an example flowchart of a method for exchanging trust information for electronic messaging entities in accordance with the principles of the present invention.

In some networking environments, it may be appropriate to exchange trust list information in a secure manner. Secure exchange of trust list information may be appropriate when the exchanged trust list information is to be transferred through networks having reduced security, such as, for example, the Internet. FIG. 4 illustrates an example flowchart of a method 400 for exchanging trust information for electronic messaging entities in accordance with the principles of the present invention. The method 400 will be discussed with respect to the clients and messaging servers depicted in network architecture 200.

Method 400 includes an act of accessing a received messaging address (act 401). Act 401 can include a requesting messaging server accessing a received messaging address. For example, messaging server 260 can access a messaging address from electronic message 216. Alternately, messaging server 260 may access an electronic messaging address from an electronic message stored in electronic message store 266. The received messaging address can correspond to an entity that access electronic messages at a providing messaging server. For example, messaging server 260 may access a messaging address from electronic message 216 that correspond to entity 291.

Method 400 includes an act of generating a received address hash value for the received messaging address (act 402). Act 402 can include the requesting messaging server generating a received address hash value for the received messaging address. For example, messaging server 260 can generate a received address hash value for a messaging address that corresponds to entity 291. A received address hash value can be created using virtually any hashing algorithm (e.g., algorithms that generate cryptographically strong one-way hashes), including SHA-1 and MD-5.

Method 400 includes a functional result-oriented step for securely exchanging messaging addresses with another messaging server (step 411). Securely exchanging messaging addresses can reduce the likelihood of revealing relationships between messaging entities. Step 411 can include any corresponding acts for securely exchanging messaging addresses with another messaging server. However, in the illustrated example of FIG. 4, step 411 includes a corresponding act of sending a request for remote messaging addresses associated with the received messaging address (act 403). Act 403 can include the requesting messaging server sending a request for remote messaging address associated with the received messaging address to a providing messaging server.

For example, messaging server 260 can send trust list request 217 to messaging server 230. Prior to sending trust list request 217, messaging server 260 can generate a public/private key pair for encrypting and decrypting data. Accordingly, data encrypted with the public key of the public/private key pair can essentially only be decrypted with the corresponding private key of the public/private key pair. Messaging server 260 can include the received address hash value and the public key in trust list request 217. Trust list request 217 can be sent using any of a number of protocols, including SMTP. In some embodiments, messaging servers have designated messaging addresses (e.g., a specified electronic mail address) used for the exchange of trust list information. This may allow trust list information to be exchanged through firewalls or other security modules.

Method 400 includes an act of receiving an indication that the providing messaging server is to search for locally stored messaging addresses associated with at least one received messaging address (act 407). An indication that the providing message server is to search for locally stored messaging addresses may result from receiving a request message, such as, for example, trust list request 217. It may also be that messaging server 230 has pre-determined intervals when it sends trust list information. Thus, although messaging server 230 receives trust list request 217, messaging server 230 may not immediately respond to trust list request 217. Instead, messaging server 230 may queue trust list request 217 until a pre-determined interval occurs. It may also be that messaging server 230 and messaging server 260 have a prior agreement as to when trust list information will be exchanged. Accordingly, the occurrence of a pre-determined time interval may cause messaging server 230 to search for locally stored messaging addresses even when no requests have been received from messaging server 260.

It may be that a providing messaging server is configured not to respond to trust list requests from requesting messaging servers in a particular domain (e.g., test.org) or range of Internet Protocol ("IP") addresses. For example, an administrator may configure messaging server 230 not to reply to trust list requests from a domain or range of IP addresses that includes messaging server 260. A providing messaging server can be configured not to reply to trust list requests as part of a general security policy (e.g., company A does not want to have any contact with company B). Subsequent to the configuration, the providing messaging server receives a trust list request from a requesting messaging server. For example, messaging server 230 can receive trust list request 217 from messaging server 260.

In response to receiving a trust list request, the providing messaging server can determine that the requesting messaging server is in the particular domain or range of IP addresses. A providing messaging server can identify the domain and/or IP address a trust list request originated from and compare the identified domain and/or IP address to domains and/or IP addresses that the providing messaging server is configured not to reply to. For example, messaging server 230 can compare a domain and/or IP address of messaging server 260 to domains and IP addresses that messaging server 230 is configured not to reply to. When messaging server 260 is included in such a domain or range of IP addresses, message server 230 may not reply to trust list request 217. When a providing messaging server determines not to reply to a trust list request, the providing messaging server terminates the trust list request such that the trust list request is not processed. For example, messaging server 230 can terminate trust list request 217 when messaging server 230 is not to respond to a domain or range of IP addresses that includes messaging server 260.

On the other hand, a messaging server can be configured to respond to a trust list request. In response to receiving a trust list request, a receiving messaging server can attempt to identify appropriate trust information to return to the requesting messaging server. Method 400 includes an act of identifying at least one locally stored messaging address associated with a received messaging address (act 408). Act 408 can include the providing messaging server identifying at least one locally stored messaging address associated with a received messaging address that was selected from among the at least one received messaging addresses. For example, messaging server 230 can identify one or more messaging addresses contained in trust list 233 that are associated with a received messaging address. To identify locally stored messaging addresses, messaging server 230 can compare a received address hash value to local address hash values stored in trust list 233. Local address hash values can represent messaging addresses from address book lists, that were accessed from previous electronic messages received at messaging server 230, or that were received from another messaging server's trusted list.

Hashing algorithms used by messaging servers can be agreed to before trust list information exchanged. Thus, all messaging servers may agree on a common hashing algorithm. For example, messaging servers 230 and 260 can agree to use the SHA-1 hashing algorithm for generating address hash values. Accordingly, when a received address hash value (representing a received messaging address from a received electronic message) is used to search for locally stored address hash values, there is increased confidence that the any locally stored messaging address associated with the received messaging address will in fact be identified. Alternately, a sending server can send an indication of a particular hashing algorithm to a receiving server to indicate an algorithm that was used to generate a hash value for a particular messaging address. The sending server can send the hashing algorithm indication separate from or along with a hash value or hash values that were generated using the particular hashing algorithm.

Method 400 includes an act encrypting at least one local address hash value corresponding to the identified at least one locally stored messaging address (act 409). Act 409 can include the providing messaging server encrypting at least one local address hash value that corresponds to the identified at least one locally stored messaging address. The providing messaging server can encrypt local address hash values with a public key previously received from a requesting messaging server. For example, messaging server 230 can encrypt any identified local address hash values from trust list 233 with a public key previously received from messaging server 260 (e.g., included in trust list request 217). To further obfuscate relationships between messaging entities, messaging server 230 can include one or more local address hash values that are not related to trust list request 217.

Method 400 includes an act of sending the at least one encrypted local address hash value to a receiving message server (act 410). Act 410 can include the providing messaging server sending the at least one encrypted local address hash value to a receiving message server. For example, messaging server 230 can send trust list response 218 to messaging server 260. If local address hash values have been identified from trust list 233, trust list response 218 can include the identified local address hash values. Local address hash values can be transferred in trust list entry data structures that indicate the degree of separation between the received messaging address and a locally stored messaging address. If no local address hash values have been identified, trust list response 218 can indicate that no local address hash values were identified.

Step 411 includes a corresponding act of receiving at least one encrypted remote address hash value (act 404). Act 404 can include the requesting messaging server receiving at least one encrypted remote address hash value from the providing messaging server. For example, messaging server 260 can receive encrypted remote address hash values (e.g., represented in trust list entry data structures), included in trust list response 218, from messaging server 230. Alternately, trust list response 218 may indicate that no remote address hash values were identified.

Method 400 includes an act of decrypting the at least one encrypted remote hash value with a corresponding private key (act 405). Act 405 can include the requesting messaging server decrypting the at least one encrypted remote hash value with a corresponding private key to reveal a corresponding at least decrypted remote address hash value. For example, messaging server 260 can use the private key from a previously generated public/private key pair to decrypt encrypted remote address hash values included in trust list response 218. Method 400 includes an act assimilating the at least one decrypted remote address hash value into a requesting side trust list (act 406). Act 406 can include a requesting message server assimilating at least one decrypted remote address hash value into a corresponding trust list. For example, messaging server 260 can assimilate decrypted remote address hash values into trust list 263.

Assimilating remote address hash values into a trust list can include updating existing trust relationships and storing updated trust relationships in a corresponding trust list. When a sending server sends address hash values, the address hash values may indicate messaging entities already included in a receiving server's trust list. When the sent address hash values indicate different degrees of separation between messaging entities than is currently stored, entries in the receiving server's trust list can be updated. For example, when messaging entity D's server sends a trust list (i.e., one or more address hash values), the sent trust list may include addresses for messaging entities that are already in messaging entity E's trust list (e.g., a messaging entity F). Further, messaging entity E's trust list may indicate that messaging entity E and messaging entity F are separated by three degrees of separation.

Accordingly, if the sent trust list indicates messaging entity D and messaging entity F are separated by one degree of separation, messaging entity E's trust list can be updated to indicate that messaging entity E and messaging entity F are separated by two degrees of separation. Other messaging entities included in the sent trusted list, can also be added to messaging entity E's trusted list. The degree of separation between messaging entity E and an included messaging entity is equal to the sum of the degree of separation between messaging entity E and messaging entity D plus the degree of separation between messaging entity D and the included messaging entity.

Accordingly, through embodiments of the present invention messaging server 230 can securely push a portion of trust list information to messaging server 260, even if message server 260 has not expressly requested the portion of trust list information. In a similar manner, messaging server 260 can securely push a portion of trust list information to message server 230, even if message server 230 has not express requested the portion of trust list information. Through trust list updates, a messaging server may receive trust information associated with messaging entities that have not previous sent electronic messages to the messaging server. Thus, a messaging server may be able to appropriately categorize a first electronic message received from such messaging entities. When a messaging entity has a reduced reliability index, the messaging server can appropriately categorize a received electronic message from the messaging entity as SPAM, even when no electronic messages have previously been received from the messaging entity.

In some embodiments, servers propagate trust list information in an ongoing manner such that trust lists evolve as trust levels between messaging entities change. A sending messaging server can include information in a header portion (e.g., in an SMTP header) of an electronic message that is sent to a receiving messaging server. Following is example information that can be added to an electronic message header:

X-Trust-Updates: <N>

In the example information, "N" equals the number of updates at a sending messaging server that have yet to be sent to a receiving messaging server. When N reaches a configurable threshold (e.g., 10 updates), the receiving messaging server can request a trust list update from the sending messaging server.

Alternately, when messaging servers initially exchange trust list information, the messaging servers may also exchange parameters that indicate how often subsequent trust list information is to be exchanged. For example, a sending messaging server can send a date and/or time, a time interval, a threshold number of yet to be sent updates, etc., to a receiving messaging server. When the date and/or time or time interval occurs or when the threshold number is reached, the receiving message server can push trust list updates to the sending messaging server.

Embodiments of the present invention increase the chance of two messaging entities that have never before exchanged electronic messages being able to do some with some level of trust. For example, it may be that in a particular messaging environment each messaging entity has 32 unique first degree contacts, each of the 32 unique first degree contacts also have 32 unique first degree contacts, etc. and that the messaging environment stores trust information for up to four degrees of separation. Accordingly, each messaging entity would have access to trust information for $32^4$, or approximately one-million, other messaging entities. Accordingly, as degrees of separation stored in a trust list increases, the chance of identifying some level of trust between messaging entities (even between messaging entities that have not previously exchanged electronic messages) also increases.

Further as trust information for a message entity changes the trust associated with the messaging can also change. For example, when a messaging entity sends increased numbers of legitimate electronic messages, the trust associated with the messaging entity can increase. On the other hand, when a messing entity is identified as sending unwanted and/or unsolicited electronic messages, the trust associated the messaging entity can decrease. Changes in the associated trust of a messaging entity can also be propagated to other messaging entities associated with the messaging entity. For example, when messaging entity H's server sends a trust list to messaging entity G and messaging entity G identifiers some of the messaging entities included in the trust list as SPAMMERS, messaging entity G's server can reduce associated trust for all the messaging entities included in the list including messaging entity G. Accordingly, the accuracy of the trust associated with a particular messaging entity is increased.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a messaging server that is network connectable to one or more other messaging servers and a plurality of messaging clients, the messaging server including an information manager for collecting electronic message statistical data associated with electronic messages and storing the electronic message statistical data in an activity store, the messaging server also including a trust list indicating levels of trust between messaging entities, a method for categorizing an electronic message based on a determined level of trust between a sending entity and a recipient entity, the method comprising:

an act of accessing an electronic message, the electronic message including electronic message data that was sent from the sending entity to the recipient entity;

an act of identifying a sending messaging address from the accessed electronic message, the sending messaging address corresponding to the sending entity;

an act of calculating a reliability index for the sending messaging address based at least in part on trust list information in the trust list, the trust list information indicating a level of trust between the sending entity and the recipient entity determined at least in part based on previously established trust relationships between any one or more of the sending entity and the recipient entity, the sending entity and the messaging server or the recipient entity and the messaging server such that messaging entities that have not previously exchanged messages can do so with some level of trust; and an act of categorizing the accessed electronic message based at least in part on the calculated reliability index.

2. The method as recited in claim 1, wherein the act of accessing an electronic message comprises an act of accessing an electronic message that was received from another messaging server.

3. The method as recited in claim 1, wherein the act of accessing an electronic message comprises an act of accessing an electronic message is to be sent to another messaging server.

4. The method as recited in claim 1, wherein the act of accessing an electronic message comprises an act of accessing an electronic mail message.

5. The method as recited in claim 1, wherein the act of identifying a sending messaging address from the accessed electronic message comprises an act of identifying an electronic mail address from an SMTP header.

6. The method as recited in claim 1, wherein the act of calculating a reliability index for the sending messaging address comprises an act of calculating a reliability index based on whether or not the sending messaging address is included in an address list associated with the recipient entity.

7. The method as recited in claim 1, wherein the act of calculating a reliability index for the sending messaging address comprises an act calculating a reliability index based on trust information received from one of the one or more other messaging servers.

8. The method as recited in claim 1, wherein the act of calculating a reliability index for the sending messaging address comprises an act calculating a reliability index for the sending messaging address even though no previous electronic message from the sending entity has been received at the messaging server.

9. The method as recited in claim 1, wherein the act of categorizing the accessed electronic message based at least in part on the calculated reliability index comprises an act of transferring the reliability index and a portion of trust information to an electronic message categorization plug-in.

10. The method as recited in claim 1, wherein the act of categorizing the accessed electronic message based at least in part on the calculated reliability index comprises an act of receiving an indication from an electronic message categorization plug-in that the accessed electronic message is SPAM.

11. The method as recited in claim 1, wherein the act of calculating a reliability index comprises an act of calculating a reliability index based on the number of electronic messages the sending entity has previously sent to the recipient entity.

12. The method as recited in claim 1, wherein the act of calculating a reliability index comprises an act of calculating a reliability index based on the number of electronic messages the recipient entity has previously sent to the sending entity.

13. The method as recited in claim 1, wherein the previously established trust relationships are based on one or more prior interactions involving sending or receiving electronic messages.

14. In a requesting messaging server that is network connectable to one or more other messaging servers, the requesting messaging server including an information manager for collecting electronic message statistical data associated with electronic messages and storing the electronic message statistical data in an activity store, the electronic messaging server also including a trust list indicating a determined level of trust between messaging entities, a method for securely receiving trust information from a providing messaging server from among the one or more other messaging servers, the method comprising:
- an act of accessing a received messaging address, the received messaging address corresponding to an entity that accesses electronic messages at one of the one or more other messaging servers;
- an act of generating a received address hash value from the received messaging address; a step for securely exchanging messaging addresses with the providing messaging server so as to reduce the likelihood of revealing relationships between messaging entities were the messaging addresses to be intercepted;
- an act of decrypting at least one encrypted remote address hash value with a corresponding private key to reveal a corresponding at least one decrypted remote address hash value; and
- an act of assimilating the at least one decrypted remote address hash value in the trusted list, the level of trust in the trusted list determined at least in part based on previously established trust relationships between any one or more of the messaging server and a sending entity, the messaging server and a recipient entity or the recipient entity and the sending entity such that messaging entities that have not previously exchanged messages can do so with some level of trust.

15. The method as recited in claim 14, wherein the act of accessing a received messaging address comprises an act of accessing a request that includes a received messaging address hash value and a public key from a public/private key pair.

16. The method as recited in claim 14, wherein the act of accessing a received messaging address comprises an act of accessing a request to a messaging address at the providing messaging server that is configured to receive requests for trust list information.

17. The method as recited in claim 14, wherein the act of accessing a received messaging address comprises an act of accessing a Simple Mail Transfer Protocol message received from the providing messaging server.

18. The method as recited in claim 14, wherein the previously established trust relationships are based on one or more prior interactions involving sending or receiving electronic messages.

19. A local messaging server comprising a processor and one or more physical computer-readable storage media having stored computer-executable instructions which, when executed, implement a method comprising:
- an act of accessing an electronic message, the electronic message including electronic message data that was sent from a sending entity to a recipient entity;
- an act of identifying a sending messaging address from the accessed electronic message, the sending messaging address corresponding to the sending entity;
- an act of calculating a reliability index for the sending messaging address based at least in part on trust list information in a trust list, the trust list information indicating a level of trust between the sending entity and the recipient entity determined at least in part based on previously established trust relationships between any one or more of the sending entity and the recipient entity, the sending entity and the messaging server or the recipient entity and the messaging server such that messaging entities that have not previously exchanged messages can do so with some level of trust; and
- an act of categorizing the accessed electronic message based at least in part on the calculated reliability index.

20. The method as recited in claim 19, wherein the previously established trust relationships are based on one or more prior interactions involving sending or receiving electronic messages.

* * * * *